Sept. 15, 1959 — C. F. ENGSTROM — 2,904,095
TIRE BEAD CONSTRUCTION
Filed Nov. 1, 1956 — 2 Sheets-Sheet 1
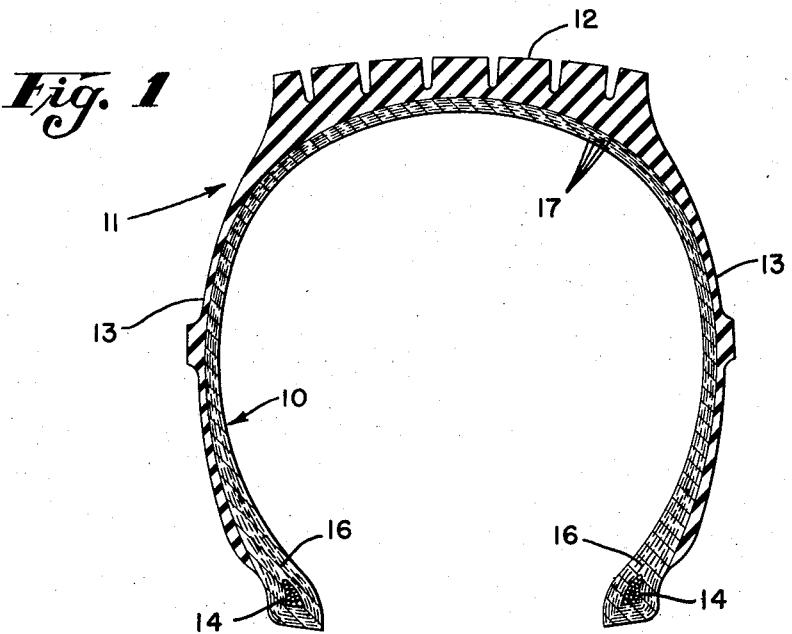
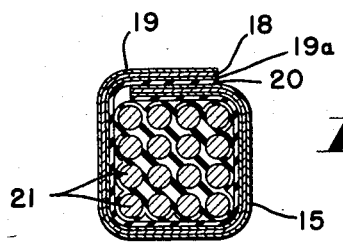
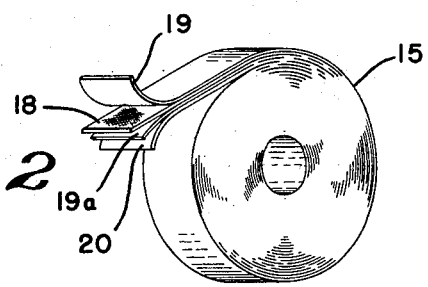
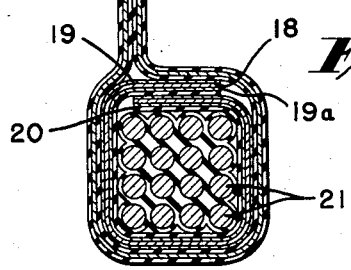
INVENTOR.
CARL F. ENGSTROM
BY James J. Long
AGENT.

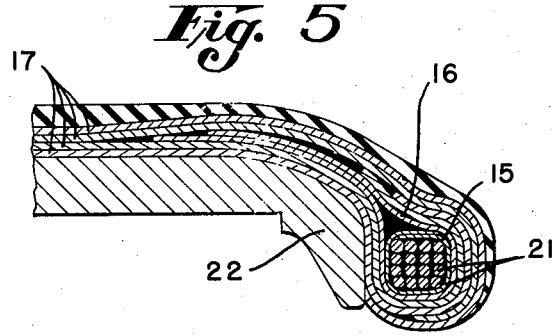
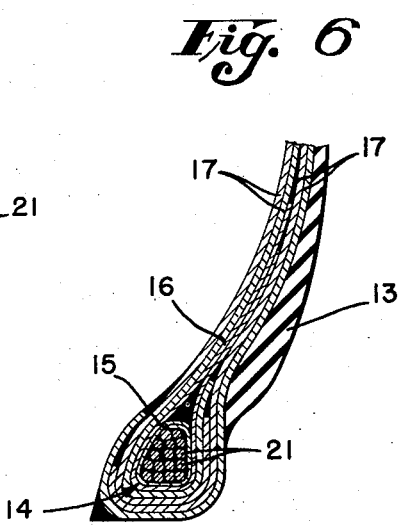
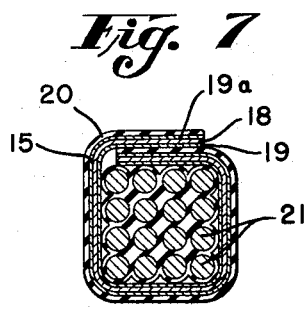
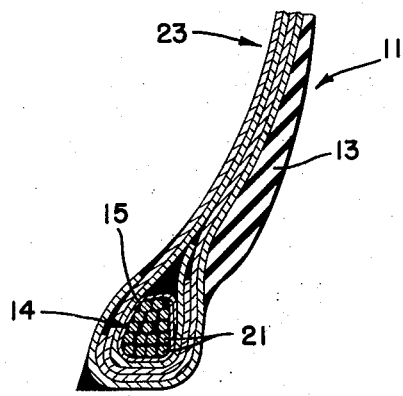
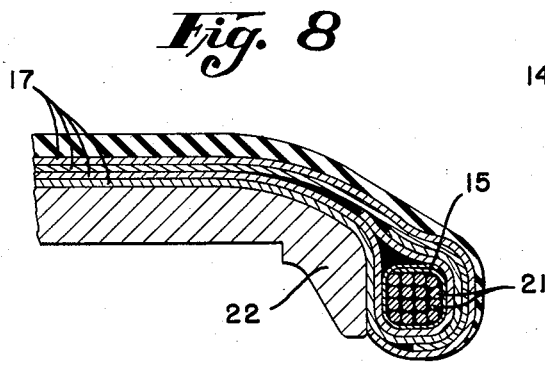

United States Patent Office 2,904,095
Patented Sept. 15, 1959

2,904,095
TIRE BEAD CONSTRUCTION

Carl F. Engstrom, Detroit, Mich., assignor to United States Rubber Company, New York, N.Y., a corporation of New Jersey Application November 1, 1956, Serial No. 619,701

8 Claims. (Cl. 152—362)

This invention relates generally to pneumatic vehicle tires and, more particularly, to improvements in the bead portions of such tires.

Present day pneumatic tires terminate in circular bead portions. In the case of a large percentage of automobile tires, each such bead portion usually includes parts of tire reenforcing fabric plies, parts of a fabric flipper, an annular bead wire bundle and a wrapper which encircles the wire bundle and is positioned between the wire bundle and the flipper. The properies, disposition and movement of the reenforcing plies, flipper and wrapper about the wire bundle, during tire fabrication, have long been recognized as being of great importance in the manufacture and service performance of the tire.

It has heretofore been a common practice, in manufacturing tires of the type mentioned above, to use wire bundle wrappers having substantially tacky or adhesive surfaces. One such wrapper that has been used extensively in the past consists of a fabric strip which is frictioned on one side and which carries on its other side a skim coat of a composition having high adhesion characteristics. In use this wrapper is applied to the wire bundle in a manner that the frictioned side is in contact with the wire bundle and the skim coated side is remote from the bundle and in contact with the flipper. Experience has shown that the raw tack of such a bead assembly is so great that rotation of the reenforcing plies and flipper about the wire bundle, in the course of fabrication, is greatly impeded and frequently results in defective tires due to the formation of cracks in the hump region thereof.

Tire beads constructed in accordance with this invention facilitate rotation of the reinforcing plies and flipper about the wire bundle and minimize the difficulties experienced in the past. These benefits are obtained by employing a wrapper comprising a fabric body that is coated on both sides, one surface of the wrapper having low raw adhesion characteristics and the other surface having high raw adhesion characteristics.

The wrapper of this invention may be advantageously employed in tires having flippers or in flipperless tires. When used in tires having flippers, it is recommended that the wrapper be applied so that the surface having the high adhesion characteristics is in contact with the wire bundle and the surface having the low adhesion characteristics is in contact with the flipper. When used in tires that do not contain flippers, it is recommended that the wrapper be inverted so that the surface thereof having the low adhesion characteristics is in contact with the wire bundle and the surface having the high adhesion characteristics is in contact with one of the reenforcing plies.

The wrapper includes a flexible body, preferably comprising a strip of a cord fabric which will be described in greater detail further along herein. The body is coated on both sides, preferably by dipping, with a latex composition having low raw adhesion characteristics. A skim coat of a rubber-like composition having high raw adhesion characteristics is then applied over one of the latex coatings.

The finished wrapper is formed in a roll with the skim coat inside. This facilitates handling, storing and applying the wrapper to the wire bundle and eliminates the need for a cloth or other type liner that is usually required between layers of roller conventional wrappers. The foregoing constitute important advantages. Other advantages include:

(a) Wrapped wire bundles for use in tires containing flippers may be readily stacked, during storage or transportation, without adhering to each other and causing stripping of the skim coats from the wrappers at the time individual bundles are removed from the stack; and (b) Beads constructed in accordance with this invention minimize the likelihood of causing formation of objectionable cracks in the tire hump region. This permits the use of more rubber insulation in the wire bundle, thereby improving its resistance to separation or cutting by individual turns of wire in the bundle.

The primary object of this invention is to facilitate turning certain elements of a tire bead about its bead wire bundle, during manufacture, and thereby reduce the possibility of causing defects, such as cracks, to be formed in the hump region of a finished tire.

Another object of this invention is to provide an improved wrapper for bead wire bundles and the like.

The objects and advantages of this invention will be readily understood by persons skilled in the art from the following detailed description taken in conjunction with the accompanying drawings which respectively describe and illustrate two tire bead constructions embodying the invention.

In the drawings, wherein like references numerals denote corresponding parts throughout the several views:

Fig. 1 is a cross-sectional view of a cured pneumatic tire having beads constructed in accordance with this invention;

Fig. 2 is a perspective view of a roll of a wrapper for covering bead wire bundles, the outer end portions of certain coatings being shown peeled back from the body of the wrapper;

Fig. 3 is an enlarged cross-sectional view of a wrapped bead wire bundle prior to assembling the same with other parts of the tire and fabricating the tire;

Fig. 4 is a view similar to Fig. 3 and showing a flipper in engagement with the wrapped wire bundle of Fig. 3;

Fig. 5 is a cross-sectional view of the bead region of a tire building drum showing part of an uncured tire positioned thereon with the reenforcing plies and flipper extending beyond the upper left hand corner of a wrapped bead wire bundle of the type shown in Fig. 3;

Fig. 6 is an enlarged cross-sectional view of the bead and adjacent portions of the cured tire of Fig. 1 and showing the reenforcing plies and flipper of Fig. 5 rotated about the wrapped bead wire bundle and now extending beyond the upper right corner of the wire bundle; and Figs. 7, 8 and 9 correspond to Figs. 3, 5 and 6, respectively, and illustrate a modification of the invention.

Referring initially to Fig. 1, I have illustrated therein a pneumatic vehicle tire comprising a carcass assembly 10 and a tread assembly 11 firmly adhered to and forming an outer encasement for the carcass assembly. The tread assembly consists of a central road-engaging tread portion 12 and sidewalls 13.

Carcass assembly 10, as best shown in Figs. 1 and 6, includes a pair of annular bead wire bundles 14, each of which is provided with a wrapper 15, a flipper 16, and a plurality of plies 17 of reenforcing cord fabric, such as nylon, rayon, cotton, or other suitable material. The_ reenforcing plies are embedded in the carcass and are folded around each wire bundle exterior of its flipper.

A roll of wrapper 15 is shown in Fig. 2 with certain coatings or layers depicted in partially separated relation for purposes of identification. The wrapper includes a flexible body 18 comprising a cord fabric which is preferably made of rayon or other suitable textile material, but which may, if desired, be made of an appropriate wire material. The wrapper body is provided, by dipping in a latex composition, with co-extensive coatings or layers of that composition. One of these coatings constitutes the outer surface of the wrapper and is identified by numeral 19. The other coating is on the inner side of the cord fabric 18 and is identified by the reference character 19a. The latex composition used for this purpose may be a conventional aqueous mixture of rubber latices and a water solution of a water soluble resorcinol-formaldehyde resin such as is used for tire cord dipping. The wrapper is dried by heat after being dipped in such a solution, leaving a deposit or coating 19, 19a of latex and resin solids over the entire flexible body 18. This coating has low friction and low adhesion characteristics. One side of body 18, e.g., the side which bears the latex-resin coating 19a, is provided with an outer skim coating 20 of a rubber-like composition. The skim coating 20 may be a conventional vulcanizable rubber stock, comprising, for example, 100 parts by weight of crude rubber, 30–40 parts of carbon black, about 10 parts of zinc oxide, and the usual quantities of vulcanizing agents, accelerators, or any other suitable desired compounding ingredients. Skim coating 20 has high adhesion characteristics as compared to the latex coatings and constitutes the inner surface of the wrapper. The skim coating 20 adheres better to the fabric 18 because of the interposition of the layer 19a of compounded latex solids. Thus, while latex and rubber-like coatings having the designated characteristics of coatings 19–19a and 20, respectively, are preferred, it is to be understood that other coatings having similar corresponding characteristics may be used in place thereof within the purview of this invention.

Reference is next had to Fig. 3 which illustrates a wrapped bead wire bundle prior to incorporating the same in the tire carcass. The wire bundle includes a single length of rubber sheathed wire 21 which is coiled and embedded in rubber to obtain an annular bundle having the illustrated cross-sectional configuration. It will be observed that wrapper 15 extends completely around the wire bundle with skim coat 20 forming intimate adhesive contact with the outer surface of the wire bundle and with the ends of the wrapper forming overlapping contact with each other along the outer periphery of the wire bundle. Latex coating 19 constitutes the outer surface of the wrapped wire bundle.

Fig. 4 shows flipper 16 applied to the wrapped wire bundle of Fig. 3. The flipper may be of any desired fabric material, and, if desired, may comprise a material that is the same as or similar to that of wrapper 15. Flipper material is processed by first dipping in a latex solution and then skim coating both sides. This presents the raw tacky surface necessary on one side for adhering the tails of the flipper together and the raw tack necessary on the other side for fabricating with the ply fabrics. The latex coating 19 of the wrap is nonadhesive to such a degree as to permit rotation with the coacting surface of the flipper. Thus, at least the surface of the flipper that is contiguous the wrapper in nonadhesive to permit turning movement of the flipper and other parts about the wrapped wire bundle during manufacture.

The parts of the carcass are assembled in the uncured state on a tire building drum. It will be understood that tires embodying my invention are built in the conventional manner. Thus, in the case of a four-ply tire, the first and second plies may be placed on the building drum 22 after which the wrapped bead wire bundles, with or without flippers, are placed in position at the ends of the drum over the ends of the first two plies; then the ends of the first and second plies are "turned up" around the bead wire bundle at each end; thereafter the third and fourth plies are applied and their ends are "turned down" around the covered bead wire bundle; thereafter the tread and sidewall stocks, and any finishing or chafter strip used around the bead area, are placed in position; the drum is then collapsed and the uncured barrel-shaped assembly is then shaped (i.e., "expanded" or converted into toroidal form) and cured in the usual way. In the course of the curing operation, the various plies and other parts become securely adhered together. It will be understood that the particular plylock, i.e., disposition of the ends of the plies around the bead wire bundles constitutes no part of the present invention. It will also be understood that my invention is applicable regardless of the number of plies used. Fig. 5 illustrates a bead wire bundle and other elements of the carcass positioned on a bead-forming portion 22 of the building drum. With the parts so positioned, flipper 16 and reenforcing plies 17 are disposed above and to the left of the upper left-hand corner of the wire bundle.

In the course of the tire shaping and molding operation the reenforcing plies and the flipper are moved about the wrapped wire bundle from the relative position shown in Fig. 5 to that shown in Fig. 6. Such movement is facilitated and the formation of objectionable hump cracks is minimized due to the above described bead construction.

Figs. 7, 8 and 9 illustrate a modified bead construction for flipperless tires. The tire of the modification comprises a carcass assembly 23 and a tread assembly 11. As in the case of the earlier described bead construction, the carcass of the modifications includes a bead wire bundle 14, a wrapper 15 and reenforcing plies 17, but does not include a flipper. Thus, one of the reenforcing plies extends around and bears directly against the surface of the wire bundle wrapper (Figs. 8 and 9).

As shown in Fig. 7, wrapper 15 is inverted from the position shown in Fig. 3 so that its low adhesion latex coating 19 bears against the wire bundle and its high adhesion skim coat 20 is remote from the wire bundle. It will be appreciated that the reenforcing plies and the wrapper will rotate in unison around the bead wire bundle in the course of shaping the tire.

The present invention is applicable to both tubeless and tube-type tires. As will be obvious, in the case of a tubeless tire a suitable air-impermeable liner will be provided over the entire interior of the tire, this liner being built into the tire in unitary fashion during its manufacture. In the case of a tubeless tire, a plurality of rim flange-engaging rubber sealing ribs on the outside of the beads may optionally also be provided.

Thus, it will be seen that the bead and wrapper constructions herein shown and described are well adapted to accomplish the objects of this invention. It will be understood, however, that the invention may be embodied otherwise than as here shown, and that in the forms illustrated certain obvious changes may be made. Therefore, I do not wish to be limited precisely to the constructions disclosed herein except as may be required by the appended claims considered with reference to the prior art.

Having thus described my invention, what I claim and desire to protect by Letters Patent is:

1. In a bead for a pneumatic tire, an annular bead wire bundle, a wrapper disposed around the wire bundle, the outer surface of the wrapper having low raw adhesion characteristics and the inner surface having high raw adhesion characteristics and forming adhesive contact with the wire bundle, a flipper folded around the wire bundle and the wrapper and forming non-adhesive contact with the outer surface of the wrapper, and at least one ply of a reenforcing fabric folded around the wire bundle exterior of the flipper.

2. In a bead for a pneumatic tire, an annular bead wire bundle, a wrapper disposed around the wire bundle, and at least one ply of a reenforcing fabric folded around the wire bundle exterior of the wrapper, the inner surface of the wrapper having low raw adhesion characteristics and forming non-adhesive contact with the wire bundle, the outer surface of the wrapper having high raw adhesion characteristics and forming adhesive contact with the inner surface of the reenforcing fabric.

3. In a bead for a pneumatic tire, an annular bead wire bundle, a wrapper disposed around the wire bundle, said wrapper comprising a fabric body, a layer of a latex composition having low raw adhesion characteristics carried by and coextensive with each side of the fabric body, one of said layers constituting the outer surface of the wrapper, and a skim coating of a rubber-like composition having high raw adhesion characteristics bearing against and coextensive with the other layer and constituting the inner surface of the wrapper, said inner surface forming adhesive contact with the wire bundle, a flipper folded around the wire bundle and forming non-adhesive contact with the outer surface of the wrapper, and at least one ply of a reenforcing fabric folded around the wire bundle exterior of the flipper.

4. In a bead for a pneumatic tire, an annular bead wire bundle, a wrapper disposed around the wire bundle, and at least one ply of a reenforcing fabric folded around the wire bundle exterior of the wrapper, said wrapper comprising a fabric body, a layer of a latex composition having low raw adhesion characteristics carried by and coextensive with each side of the fabric body, one of said layers constituting the inner surface of the wrapper, and a skim coating of a rubber-like composition having high raw adhesion characteristics bearing against and coextensive with the other layer and constituting the outer surface of the wrapper, the inner surface of the wrapper forming non-adhesive contact with the wire bundle and outer surface of the wrapper forming adhesive contact with the reenforcing fabric.

5. A pneumatic rubber tire having a carcass comprising a bead structure formed of a plurality of rubberized cord fabric plies lapped around a fabric-wrapped bundle of rubber-sheathed bead wires in each bead area, said bundle being wrapped with a strip of fabric having on one side a coating of the solids deposited from rubber latex, said coating having low friction and low adhesive characteristics prior to vulcanization adapted to form non-adhesive contact with an element of said bead structure, said strip of fabric having on the other side a skim coating of a rubber-like composition having high adhesion characteristics prior to vulcanization adapted to form adhesive contact with another element of said bead structure, a tread and sidewalls, the whole being shaped and vulcanized to form a unitary structure, whereby during shaping, relative rotation between said bead wires and fabric plies is facilitated, for the purpose set forth.

6. A method of building a pneumatic rubber tire provided with a bead structure which comprises the steps of applying a plurality of rubberized cord fabric carcass plies on a building drum, lapping the edges of said plies around a fabric-wrapped bundle of rubber-sheathed bead wires at each end of the drum, said bundle being wrapped with a strip of fabric having on one side a coating of the solids deposited from rubber latex, said coating having low friction and low raw adhesion characteristics prior to vulcanization adapted to form non-adhesive contact with an element of said bead structure, said strip of fabric having on the other side a skim coating of a rubber-like composition having high raw adhesion characteristics prior to vulcanization adapted to form adhesive contact with another element of said bead structure, applying a tread and sidewalls to the resulting carcass, shaping the resulting assembly, and curing the shaped assembly, said non-adhesive contact between the wrapper and said element of the bead structure facilitating relative rotation between said bead wires and fabric plies during said shaping.

7. In a bead for a pneumatic tire, an annular bead wire bundle, a wrapper disposed around the wire bundle, one surface of the wrapper having low raw adhesion characteristics and the other surface having high raw adhesion characteristics, and at least one ply of a reinforcing fabric folded around the wire bundle exterior of the wrapper, the low raw adhesion characteristics of said one surface facilitating relative rotation between said ply of reinforcing fabric and said wire bundle to minimize defects in the bead region of the tire when the tire is expanded from a flat band shape to a toroidal form.

8. A bead structure for a pneumatic tire comprising, an annular bead wire bundle, a wrapper disposed around the wire bundle, one surface of the wrapper having low raw adhesion characteristics and the other surface having high raw adhesion characteristics, and at least one ply of a reinforcing fabric folded around the wire bundle exterior of the wrapper, one surface of said wrapper forming adhesive contact with one element of said bead structure, and the other surface of said wrapper forming non-adhesive contact with another element of said bead structure, whereby relative rotation between said wire bundle and ply of reinforcing fabric is facilitated when the tire is expanded from a flat band shape to a toroidal form.

References Cited in the file of this patent
UNITED STATES PATENTS

| | | |
|---|---|---|
| 1,455,744 | Diamond | May 15, 1923 |
| 1,969,438 | Warden | Aug. 7, 1934 |
| 2,000,869 | Taylor | May 7, 1935 |
| 2,486,669 | Nassimbene | Nov. 1, 1949 |